United States Patent [19]

Ingram, II

[11] Patent Number: 6,145,559
[45] Date of Patent: Nov. 14, 2000

[54] AXLE AND HUB ASSEMBLY FOR AUTOMATIC TIRE INFLATION PRESSURIZATION SYSTEM

[75] Inventor: Rupert Henry Ingram, II, Somerset West, South Africa

[73] Assignee: Accessio, Ltd., Charlestown, St. Kitts/Nevis

[21] Appl. No.: 09/390,601

[22] Filed: Sep. 3, 1999

[51] Int. Cl.$^7$ .................................................. B60C 23/00
[52] U.S. Cl. ............................................................ 152/417
[58] Field of Search .................................... 152/415, 416, 152/417, 418

[56] References Cited

U.S. PATENT DOCUMENTS

| | | | |
|---|---|---|---|
| 4,431,043 | 2/1984 | Goodell et al. | 152/417 |
| 4,678,017 | 7/1987 | Schultz | 152/416 |
| 4,685,501 | 8/1987 | Williams | 152/417 |
| 4,844,138 | 7/1989 | Kokubu | 152/417 |
| 4,932,451 | 6/1990 | Williams et al. | 152/417 |
| 5,174,839 | 12/1992 | Schultz et al. | 152/415 |
| 5,287,906 | 2/1994 | Stech | 152/417 |
| 5,429,167 | 7/1995 | Jensen | 152/417 |
| 5,584,949 | 12/1996 | Ingram | 152/417 |
| 5,767,398 | 6/1998 | Naedler | 73/146.2 |
| 5,769,979 | 6/1998 | Naedler | 152/417 |
| 5,868,881 | 2/1999 | Bradley | 152/417 |

*Primary Examiner*—Russell D. Stormer
*Attorney, Agent, or Firm*—Choate. Hall & Stewart

[57] ABSTRACT

A rotary axle and hub assembly is provided for vehicles having an onboard, automated tire inflation system. The assembly includes a rotary air connection assembly threadably mounted on the hubcap. The rotary air connection can be readily disassembled to allow rotary seal replacement. The rotary air connection is connected to an air conduit that is flexible, coaxially extendable through, and longitudinally and laterally movable in the hubcap and axle, allowing movement and misalignment between the rotating and stationary parts of the axle and hub assembly. The flexible air conduit enters the axle beam via a bulkhead fitting which allows movement of the air conduit in and out of the axle beam, thereby allowing the rotary air connection to be mounted and dismounted from the hubcap. The bulkhead includes a pressure relief valve to allow excess air pressure in the axle and hub areas to be vented to the atmosphere.

22 Claims, 4 Drawing Sheets

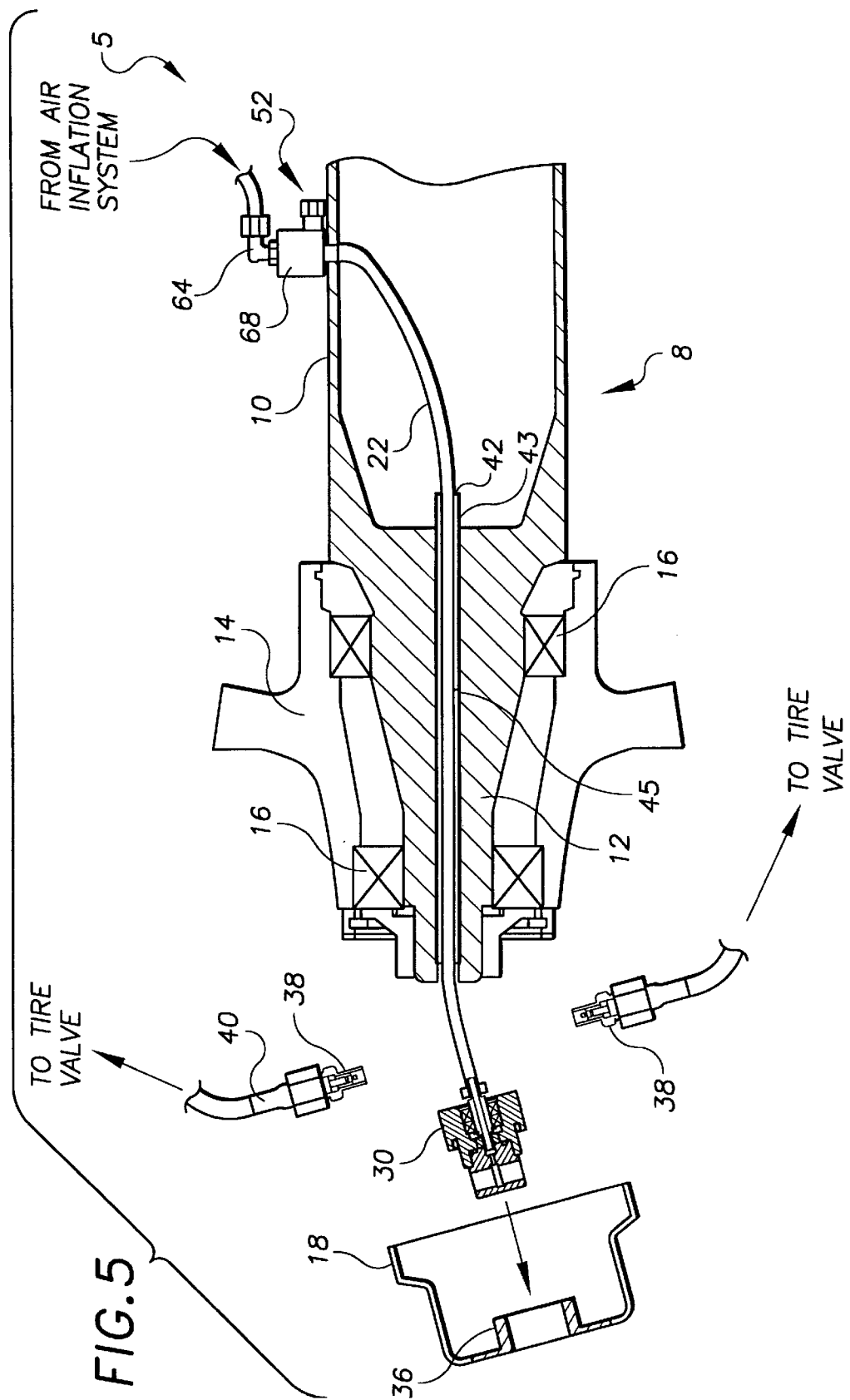

AXLE AND HUB ASSEMBLY FOR AUTOMATIC TIRE INFLATION PRESSURIZATION SYSTEM

FIELD OF THE INVENTION

This invention relates to the design of an automatic tire inflation system for maintaining tire pressure in vehicles, especially trucks and other long-haul vehicles, and, more specifically, to an axle and hub assembly for such a system.

BACKGROUND OF THE INVENTION

The concept of a tire inflation system has been implemented on military vehicles for many years. Many military vehicles are equipped with a central tire inflation system (CTIS) which incorporates both inflation and deflation features, allowing the pressure of the tire to be varied in response to the road conditions experienced by a vehicle. For example, on relatively soft terrain, the tires should be deflated somewhat to improve traction. In contrast, on harder surfaces, such as paved roads, the tires should be more highly pressurized; however, over-inflation can result in both uneven wear to the tires and damage to the road.

In contrast, commercial tire inflation systems for use on trucks and other commercial vehicles, such as those described in U.S. Pat. No. 5,584,949 to Ingram, are not necessarily designed to allow the operator to decrease or increase tire pressure based on the road conditions. Instead, their primary function is to ensure that tire pressure does not fall below a preset cold tire pressure. As tire pressure decreases, the area of the tire in contact with the road increases, increasing friction and fuel consumption. Because these commercial tire inflation systems are designed to maintain preset tire pressures, they can also decrease maintenance costs and increase the life of the tires and treads. They supply increased air pressure not only to tires which are experiencing a leak but also to tires which might only be experiencing a decrease in pressure resulting from normal use.

Most commercial air pressurization systems incorporate two elements: first, a sealable connection between a rotatable part and a stationary part and, second, means to transport air from a pressurized supply to the tire in need of increased air pressure. For example, in U.S. Pat. No. 5,287,906 to Stech, air is transported from the pressurized supply through a rigid tube which runs through the axle to a "T" connector located outside of the hub via a rotary union. Air is transported to the tires from hoses connected to the "T". Suitable rotary unions for Stech's invention are commercially available. Stech also describes an unloader valve which protects the air supply in the event of a blowout. Such valves are necessary for some pressurization systems because the pressurized air supply for the tire inflation system is typically the same as that for the brakes of the truck. In the event of a blowout, being able to stop the truck is a higher priority than maintaining the pressure in a heavily damaged tire.

The above-mentioned U.S. Pat. No. 5,584,949 to Ingram, describes an air inflation system in which the air is transported from the pressurized supply to the tire in part through the interior of the axle. The interior of the axle itself is pressurized. In this reference, tubing is connected to the pressurized axle via the hub to transport air from the inside of the axle to the tires.

In another example, U.S. Pat. No. 5,769,979 to Naedler describes a rotary air connection for the tire inflation system described in the '949 patent to Ingram. This connection includes a union between a stationary part and a rotatable part. The stationary part has a rotary seal, and the rotatable part includes a rigid tube extending through the stationary part and moveable in the rotary seal. The connection of the tube to the hubcap is a sealed swivel joint which allows the tube to move in response to misalignment of the rotatable and stationary parts of the union. The relative positions of the non-rotating axle and the rotating wheel are not fixed. As the vehicle moves, the axle and the wheel move with respect to one another in response to irregularities in the road. Improperly balanced tires or poor alignment of the wheel hub on the axle will also result in relative movement of the wheel and axle, and, as a result, the rotating and stationary parts of the union. However, the movement of the tube within the union imparts stress on the rotary seal and, over time, results in undue damage to the seal or even detachment of the tube from the connector.

Accordingly, it is an object of this invention to provide an axle and hub assembly for use with a tire pressurization system that allows for misalignment of the rotatable and stationary parts of the assembly while providing an improved rotary seal and sealing mechanism between the tire and the air pressure source.

It is a further object of this invention to provide an axle and hub assembly for use with a tire pressurization system which can be opened and repaired or undergo routine maintenance while mounted on the vehicle.

It is also an object of this invention to provide an axle and hub assembly for use with a tire pressurization system which includes safeguards to prevent damage to lubrication compartments in the wheel from excess pressure or particulate material in the axle.

SUMMARY OF THE INVENTION

In one aspect the invention is an axle and hub assembly for supplying a pressurized fluid from a non-rotating pressure source to a rotating tire of a vehicle. The assembly comprises an axle coupled to the vehicle, a wheel on which the tire is mounted and which is rotatably mounted to a spindle section of the axle, a hubcap which is mounted on and rotates with the wheel, and a rotary connection in fluid communication with the tire which is mounted to the hubcap at a non-rotating flexible conduit. The rotary connection transmits the pressurized fluid between the pressure source and the tire, and the flexible conduit is located at least partially inside the axle and is in fluid communication with the rotary connection at one end, and, at its other end, with the pressure source. Thus, the flexible conduit is moveable with respect to the rotary connection by the axle, allowing for misalignment between the rotary connection and the axle.

The axle may further include a feedthrough hole in the beam section of the axle. In this embodiment, the assembly may further comprise an axle bulkhead assembly mounted to the axle which is in fluid communication between an end of the conduit and the pressure source and which includes a sealed connection through the feedthrough hole to prevent outside containments from entering the inside of the axle. The axle bulkhead assembly may further include a fitting to allow longitudinal movement of the conduit in and out of the beam section of the axle. In addition, the axle bulkhead assembly may include a join to limit longitudinal movement of the flexible conduit from the outside to the inside of the axle beam, preventing contact between the conduit and an inner wall of the axle beam. Additionally, the axle bulkhead assembly may include a one way pressure release valve in fluid communication with the inside of the axle to vent excess pressure from the inside of the axle to the atmosphere.

At least a portion of the conduit may be curved, allowing longitudinal and lateral movement of the conduit with respect to the axle, and it may be located at least partially between the axle feedthrough hole and the spindle portion of the axle. The axle and hub assembly may further comprise a tubular protective sheath which houses and protects the conduit and at least part of the spindle portion of the axle. The protective sheath allows longitudinal movement of the conduit with respect to the sheath and blocks the movement of particles from the beam section of the axle through the spindle portion of the axle and into lubricants in the hub.

The rotary connection may include a pneumatic rotary union supported and positioned in the approximate center of the hubcap. The rotary union may include a stationary hollow shaft coupled to an end of the conduit which serves as a path for the pressurized fluid, a rotatable rotary union ring fixedly, sealably, and substantially coaxially mounted to the hubcap, a rotatable union housing sealably and coaxially mounted to the ring, at least one roller bearing coaxially connecting the hollow shaft to the housing, a circular resilient rotary seal coaxial with the housing and the hollow shaft which provides a sealable connection between the housing and the hollow shaft, and a rotatable rotary union through-piece sealably and coaxially mounted to the housing and abutting the rotary seal, maintaining the rotary seal's position with respect to the hollow shaft and the housing. The hollow shaft may include two ends and a passageway therethrough in communication with the pressurized fluid contained by the flexible conduit, wherein the second end of the shaft is sealably connected to the inner diameter of the rotary seal. The assembly of the housing, the rotary seal, and the through-piece may create a sealed rotatable pressure chamber, and the connection between the second end of the hollow shaft and the inner diameter of the rotary seal may create sealed communication between the pressure chamber and the flexible conduit connected to the first end of the shaft. The through-piece may be in fluid communication with a value assembly external to the hubcap which supplies the pressurized fluid to the tire, and it may be dismountable from the housing, allowing for rotary seal replacement. The rotary union ring may be threaded on its inner surface to allow the housing to be mounted from the inside of the hub cap.

In another aspect, the invention is an assembly for supplying a pressurized fluid from a non-rotating pressure source to a tire rotating about an axle of a vehicle. The assembly comprises a rotary connection in fluid communication with the tire which is mounted to a hubcap and a non-rotating flexible conduit located at least partially inside the axle which is in fluid communication with the rotary connection at one end and the pressure source at a second end. The flexible conduit is moveable laterally and longitudinally with respect to the rotary connection of the axle, allowing for misalignment between the rotary connection and the axle. A portion of the flexible conduit may be curved, allowing movement of the first end relative to the second end of the conduit. The assembly may further comprise a tubular protective sheath which is coaxial with the conduit and houses and protects the conduit and at least part of the axle. The protective sheath may allow longitudinally movement of the conduit with respect to the sheath and the axle. Both the flexible conduit and the protective sheath may be made of a polymer material.

BRIEF DESCRIPTION OF THE DRAWINGS

FIG. 5 is a cross-sectional view of the partially disassembled axle and hub assembly.

DETAILED DESCRIPTION

Figure 1:
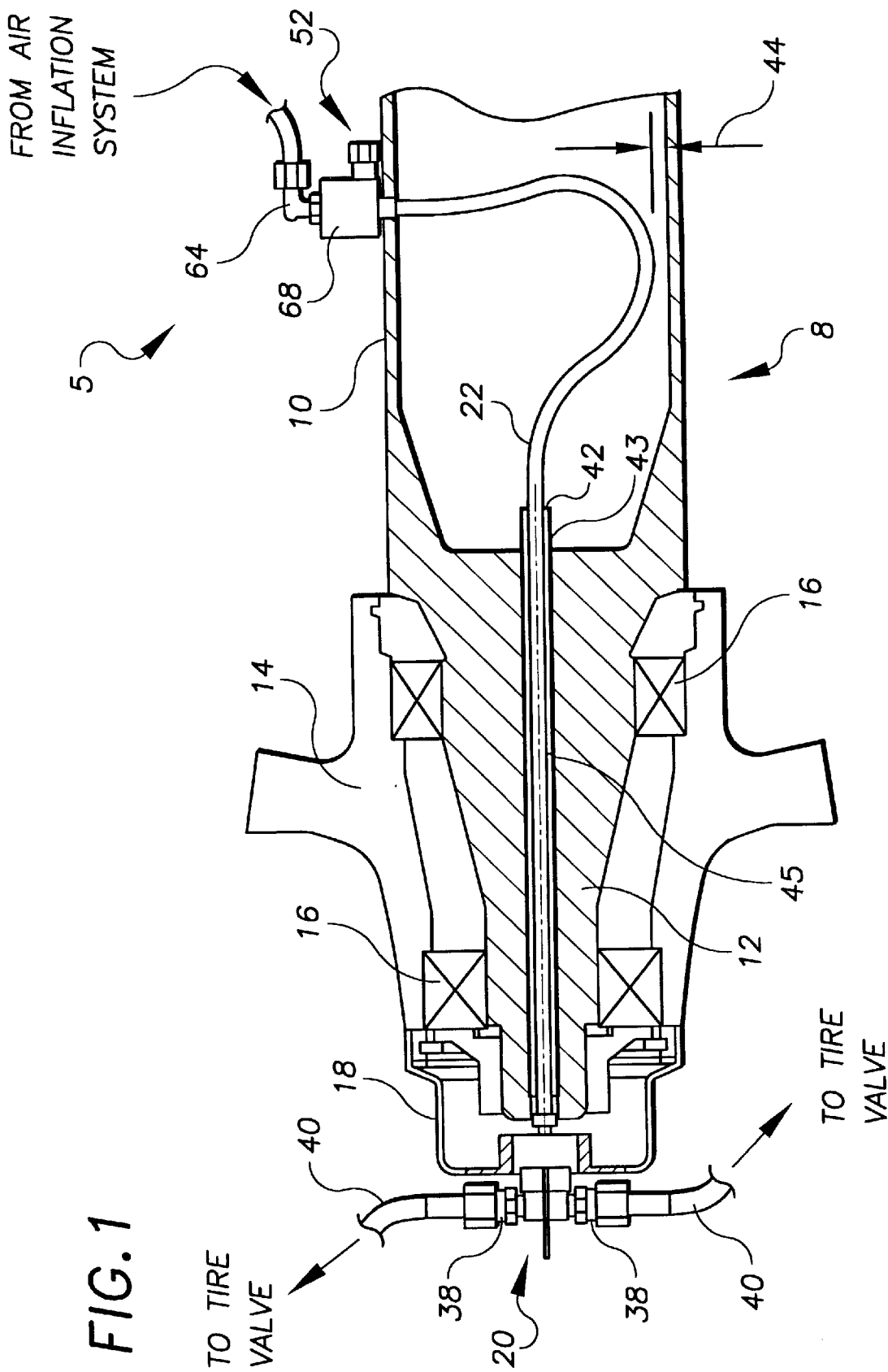
FIG. 1 is a cross-sectional view of the assembled axle and hub assembly according to the present invention.

FIG. 1 generally depicts the end of an axle on a trailer or other vehicle which would typically have several axles, each with one or more tires at each end, as described in U.S. Pat. No. 5,584,949, which is incorporated herein by reference. Such a vehicle also includes a pressurized air supply, typically used for supplying pressure both to pneumatic brakes and to the axle and hub assembly, described more fully in U.S. Pat. No. 5,287,906, which is incorporated herein by reference.

As shown in FIG. 1, reference numeral 5 indicates an assembled axle and hub assembly for use with the pressurized air supply in an on-board automated air inflation system (not shown). The axle and hub assembly 5 includes an axle 8 having two sections, an axle beam 10 and a spindle 12. A wheel 14 is mounted to the spindle 12 via axle bearings 16. A hubcap 18 is connected to and rotates with the wheel 14 and caps an end of the axle 8. A rotary union assembly 20 extends through the hubcap 18 and connects to a hollow, flexible air conduit 22. A portion of the rotary union assembly 20 rotates with the hubcap 18, while a portion of the rotary union assembly 20 that is connected to the air conduit 22 does not rotate.

The use of the air conduit obviates the need to pressurize the interior of the axle 8, as in prior air pressurization systems, such as that described in U.S. Pat. No. 5,584,949. Unlike the conduits described in either U.S. Pat. No. 5,287,906 or U.S. Pat. No. 4,844,138 to Sadao Kokubo, the conduit is flexible, minimizing stress on the conduit resulting from misalignment between the rotary union assembly 20 and the stationary axle 8.

Figure 2:
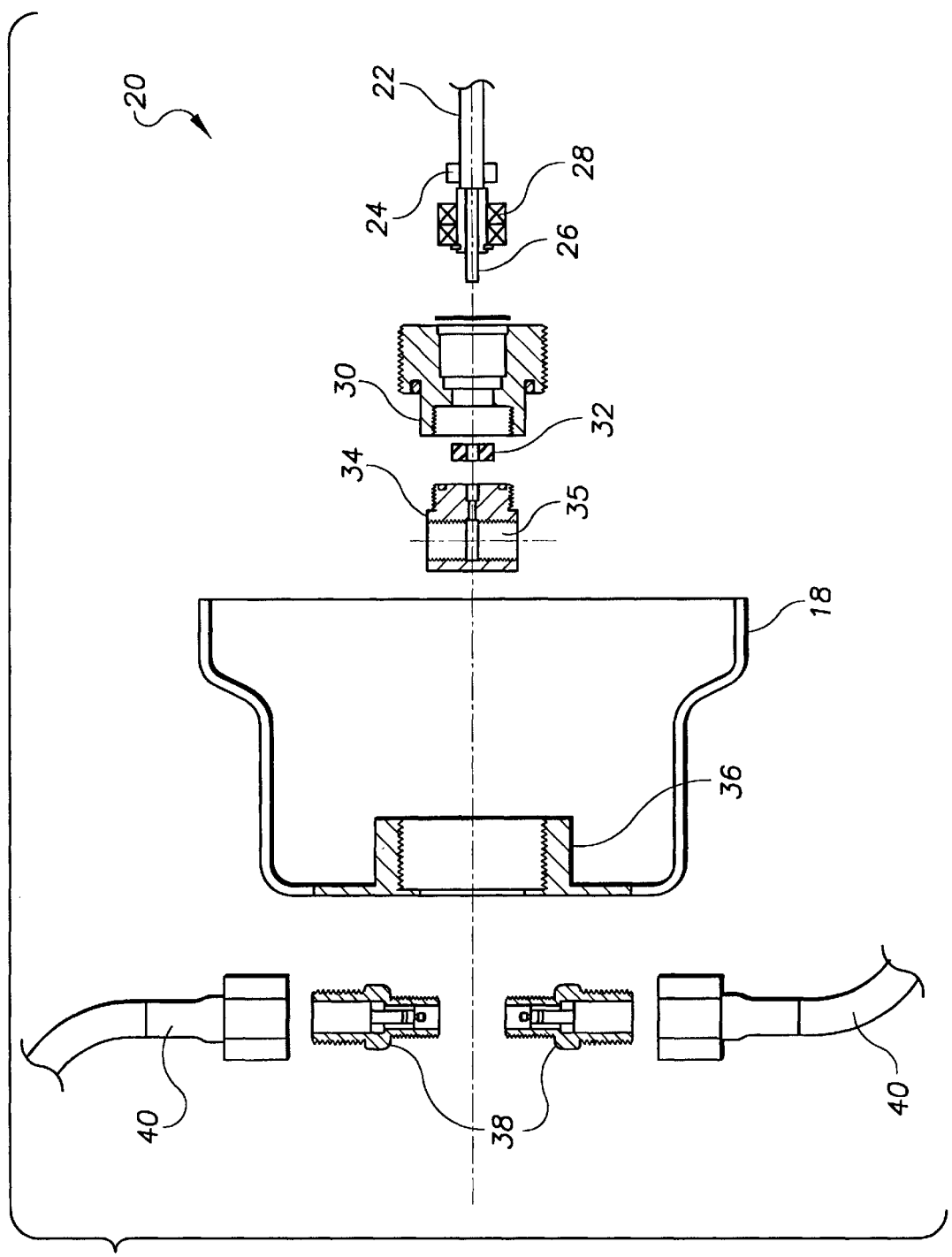
FIG. 2 is a cross-sectional exploded view of the rotary union assembly and components connected thereto.
Figure 3:
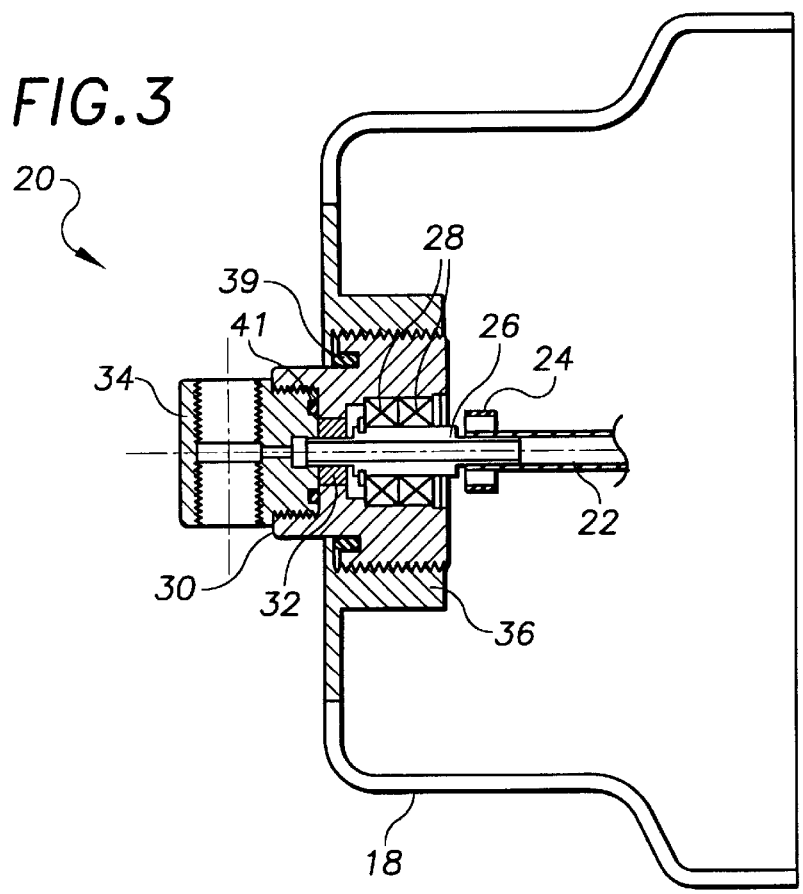
FIG. 3 is a cross-sectional view of the assembled rotary union assembly.

The separate components of the rotary union assembly 20 are shown in FIG. 2. The conduit 22 is connected to the rotary union assembly 20 via a connector 24, which connects the conduit 22 to a rotary union shaft 26. Roller bearings 28 connect the rotary union shaft 26 to the rotary union housing 30, as shown in FIG. 3, discussed below. A rotary seal 32 seated within the housing 30 sealably connects the housing 30 to the shaft 26. A rotary union through-piece 34 is also mounted to the housing 30 abutting the seal 32, maintaining the seal's position with respect to the rotary union through-piece 34. The assembled housing 30, seal 32, and through-piece 34 create a sealed, rotatable pressure chamber in communication with both the conduit 22 and tire hoses 40, which are connected to the through-piece 34 via poppet valves 38. The poppet valves 38 only open when hose 40 is connected with them. This prevents the loss of air pressure from the system if an air hose is removed for normal maintenance, such as the removal of a tire. The rotary union housing 30 is threadably connected to a rotary union ring 36 mounted on the hubcap 18. Through-way 35 of the through-piece 34 is connected to the poppet valves 38, which are in turn connected to the tire hoses 40, which lead to the tire valves (not shown). If only one tire is to be served by the rotary union assembly 20, the through-piece 34 can also be constructed as an elbow or any other suitable coupling, in which case there would only be one poppet valve 38 and one tire hose 40. Alternatively, through-way 35 can be closed at one end.

The assembled rotary union assembly 20 is shown in FIG. 3. Again, the flexible air conduit 22 is connected via the connector 24 to the rotary union shaft 26. The flexible nature of the conduit 22 allows it to move both laterally and longitudinally in response to relative movement and misalignment of any part of the rotary union assembly 20 with respect to the axle 8, which is stationary. FIG. 3 depicts how the shaft 26 is connected to the rotary union housing 30 via the roller bearings 28. In addition, an o-ring 39 seals the connection of the rotary union ring 36 and housing 30. The housing 30 is sealably connected in turn to the rotary union through-piece 34 through a second o-ring 41. The rotary seal 32 connects the rotary union shaft 26 to the rotary union throughpiece 34.

Referring back to FIG. 1, the flexible air conduit 22 described in the previous paragraph is shown over its entire length from the hubcap 18 to a bulkhead assembly 50. The bulkhead assembly 50 is mounted to the axle beam 10 through a feedthrough hole in the axle beam 10. From the axle beam 10, the conduit 22 extends at least partially through a protective sheath 42 to the rotary union assembly 20 described in conjunction with FIGS. 2 and 3. The sheath 42 is at least partially located in a throughway 45 in the spindle 12. The sheath 42 is coaxially oriented about the conduit 22, houses the conduit and protects its passage from the axle beam 10, which has a large inner diameter, to the throughway 45 in spindle 12, preventing the conduit 22 from rubbing on the sharp edge where the throughway 45 opens from the spindle 12 into the axle beam 10. The conduit 22 is movable within the sheath 42 and can be retracted therefrom. In addition, the sheath 42 prevents the migration of particles from the axle beam 10 through the inside of the spindle and into the lubricant disposed in the hub.

Within the axle beam 10, the conduit 22 is preferably curved; however, its length is limited such that contact with the interior surface of the beam 10 is preferably avoided, such that a gap 44 between a bend in the conduit 22 and the interior surface of the axle beam 10 is desirable.

The conduit 22 is preferably a polymer material that is corrosion resistant and durable. The sheath 42 may be any suitable material, such as a polymer material, that provides protection in the axle spindle 12 from abrasion, heat, and corrosion and is flexible so as to bend slightly with the conduit 22 where it exits the sheath 42 into the axle beam 10. The sheath 42 may be covered on its outer surface with a heat and corrosion-resistant brush-like material 43, such as VelcroTM, that will, while allowing air flow between the axle beam 10 and the hub areas, further prevent migration of damaging particles from the axle beam 10 through the spindle 12 to the hubcap 18 and also provide a snug fit with the inner wall of the throughway 45 in the spindle 12.

Figure 4:
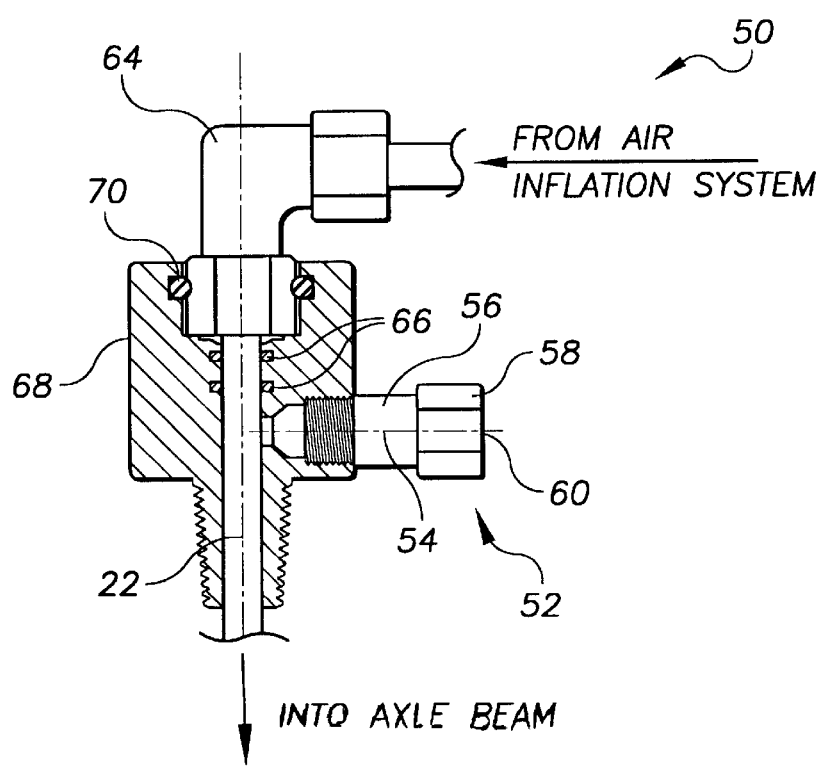
FIG. 4 is a cross-sectional view of the bulkhead assembly.

At its axle beam end, the conduit 22 is connected to the bulkhead assembly 50, which is shown in more detail in FIG. 4. The bulkhead assembly 50 comprises a connection between the conduit 22 and a pressurized fluid source or reservoir for the air inflation system (not shown). The assembly 50 also includes a one-way pressure relief valve assembly 52 which vents excess air pressure in the axle beam 10, spindle and hub areas to the atmosphere. The bulkhead assembly is connected to the axle beam via bulkhead fitting 68, which is threadably or otherwise connected to the axle beam 10 (see FIGS. 1 and 5). The connection from the conduit 22 to the pressurized fluid source includes a join 64. The join 64, in addition to connecting the air conduit 22 to the rest of the air inflation system, also includes a mechanism to limit longitudinal movement of the air conduit between the outside and the inside of the axle beam, thus preventing contact between the conduit 22 and the inner wall of the axle beam and maintaining gap 44 (as depicted in FIG. 1 and discussed above). Sealable connections between the join 64 and the conduit 22, for example, a swage-type fitting, will automatically constrain the longitudinal motion of the conduit with respect to the join. A shoulder 72 cut into bulkhead fitting 68 provides a seat for the join 64 and fixes the distance from the end of the conduit 22 to the interior surface of the axle beam 10. The connection between the bulkhead fitting 68 and the conduit 22 is sealed with one or more o-rings 66, preventing air from outside the axle from entering the axle beam. In addition, an o-ring 70 keeps the join seated in the bulkhead fitting 68.

As described in U.S. Pat. No. 5,584,949, most trailers are equipped with lubrication compartments at the ends of each axle (e.g., axle 8 in FIG. 1) which contain lubricants for the wheel bearings 16. An air leak in assembly 5 could blow out lubricants and damage certain wheel-end components such as the axle bearing the lubricant seals. To prevent this, the one-way pressure release valve assembly 52 is included in the axle and hub assembly 5. In this embodiment, the valve assembly 52 is part of the bulkhead assembly 50. The valve assembly 52 comprises a pressure release valve 54, such as a Schrader valve, contained within a valve housing 56. The valve 54 vents air to the atmosphere through a breather cap 58. A filter 60 prevents particulate material from clogging the valve assembly 52.

FIG. 5 demonstrates the function of the excess length in the flexible conduit 22, which results in the bend discussed in conjunction with FIG. 1. FIG. 5 shows how the axle and hub assembly 5 may be disassembled for maintenance or replacement. The poppet valves 38 (connect to tire hoses 40) must be disconnected from the rotary union through-piece 34 beforehand. The rotary union housing 30 is then disconnected from the rotary union ring 36, enabling removal of the hubcap 18 from the wheel end of the axle 8. The rotary union housing 30 can be pulled from the axle spindle 12, extending the flexible air conduit 22 by taking up the slack which had been stored in the axle beam 10. Once disassembled, maintenance can easily be performed on the axle and hub assembly, including replacement of the rotary seal 32 and the o-rings 39 and 41.

Other embodiments of the invention will be apparent to those skilled in the art from a consideration of the specification or practice of the invention disclosed herein. For example, other rotary unions providing a suitable connection for the flexible conduit would also be appropriate for the invention. It is intended that the specification and examples be considered as exemplary only, with the true scope and spirit of the invention being indicated by the following claims.

I claim:

1. A tire inflation assembly for supplying a pressurized fluid from a non-rotating pressure source to a rotating tire of a vehicle, comprising:
   an axle coupled to the vehicle;
   a wheel on which the tire is fixedly mounted, the wheel being mounted to the axle and rotatable with respect to the vehicle;
   a rotary connection coupled to the wheel and in fluid communication with the tire and the pressure source, the rotary connection transmitting the pressurized fluid between the non-rotating pressure source and the tire; and
   a non-rotating flexible conduit having a first end and a second end, the flexible conduit located at least partially inside the axle and being in fluid communication with the rotary connection at its first end and the pressure source at its second end, whereby the flexible conduit is movable with respect to at least one of the rotary connection and the axle, allowing for misalignment therebetween.

2. The tire inflation assembly of claim 1 the wherein the axle includes a spindle section about which the wheel rotates and a beam section that includes a feedthrough hole.

3. The tire inflation assembly of claim 2, further comprising a hub mounted to the wheel that caps the spindle section of the axle.

4. The tire inflation assembly of claim 2, further comprising an axle bulkhead assembly mounted to the axle, the bulkhead assembly being in fluid communication between the second end of the conduit and the pressure source and including a sealed connection through the feedthrough hole to prevent outside contaminants from entering the inside of the axle.

5. The tire inflation assembly of claim 4, wherein the axle bulkhead assembly includes a fitting to allow longitudinal movement of the conduit in and out of the beam section of the axle.

6. The tire inflation assembly of claim 5, wherein the axle bulkhead assembly includes a join to limit longitudinal movement of the flexible conduit from the outside to the inside of an axle beam, thereby preventing contact between the conduit and an inner wall of the axle beam.

7. The tire inflation assembly of claim 6, wherein the axle bulkhead assembly includes a one-way pressure release valve in fluid communication with the inside of the axle to vent excess pressure from the inside of the axle to the atmosphere.

8. The tire inflation assembly of claim 3, wherein at least a portion of the conduit is curved, thereby allowing longitudinal and lateral movement of the conduit with respect to the axle.

9. The tire inflation assembly of claim 8, wherein the curved portion of the conduit is located at least partially between the axle feedthrough hole and the spindle portion of the axle.

10. The tire inflation assembly of claim 3, further comprising a tubular protective sheath which houses and protects the conduit in at least part of the spindle portion of the axle, the protective sheath allowing longitudinal movement of the conduit with respect to the sheath and blocking the movement of particles from the beam section of the axle through the spindle portion of the axle and into lubricant in the hub.

11. The tire inflation assembly of claim 1, wherein the rotary connection includes a pneumatic rotary union supported and positioned in the approximate center of the axle.

12. The tire inflation assembly of claim 11, wherein the rotary union includes a stationary hollow shaft coupled to the first end of the conduit which serves as a path for the pressurized fluid;

a rotatable rotary union ring fixedly, sealably and substantially coaxially mounted to the hub;

a rotatable rotary union housing sealably and coaxially mounted to the ring;

at least one roller bearing coaxially connecting the hollow shaft to the housing;

a circular, resilient rotary seal coaxial with the housing and the hollow shaft, providing a sealable connection between the housing and the hollow shaft;

a rotatable rotary union through-piece sealably and coaxially mounted to the housing and abutting the rotary seal, thereby maintaining the rotary seal's position with respect to the hollow shaft and the housing; and the hollow shaft including two ends and a passageway therethrough in communication with the pressurized fluid contained by the flexible fluid conduit, the second end of the shaft being sealably connected to the inner diameter of the rotary seal.

13. The tire inflation assembly of claim 12, wherein the assembly of the housing, the rotary seal, and the through-piece create a sealed rotatable pressure chamber, and the connection between the second end of the hollow shaft and the inner diameter of the rotary seal creates sealed communication between the pressure chamber and the flexible conduit connected to first end of the shaft.

14. The tire inflation assembly of claim 12, wherein the through-piece is in fluid communication with a valve assembly external to the hub which supplies the pressurized fluid to the tire.

15. The tire inflation assembly of claim 12, wherein the through-piece is dismountable from the housing to allow for rotary seal replacement.

16. The tire inflation assembly of claim 12, wherein the rotary union ring is threaded on its inner surface to allow the housing to be mounted from the inside of the hub.

17. An assembly for supplying a pressurized fluid from a non-rotating pressure source to a tire rotating about an axle of a vehicle, comprising:

a rotary connection in fluid communication with the tire; and a non-rotating flexible conduit located at least partially inside the axle and in fluid communication with the rotary connection at its first end and the pressure source at its second end, whereby the flexible conduit is movable with respect to the rotary connection and the axle, allowing for misalignment therebetween.

18. The assembly of claim 17, wherein at least a portion of the flexible conduit is curved, thereby allowing movement of the first end relative to the second end of the conduit.

19. The assembly of claim 17, further comprising a tubular protective sheath coaxial with the conduit which houses and protects the conduit in at least part of the axle, the protective sheath allowing longitudinal movement of the conduit with respect to the sheath and the axle.

20. The assembly of claim 17, wherein the flexible conduit is made of a polymer material.

21. The assembly of claim 19, wherein the protective sheath is made of a polymer material.

22. A tire inflation assembly for supplying a pressurized fluid from a non-rotating pressure source to a tire rotating about an axle of a vehicle, comprising:

a rotary connection in fluid communication with the tire and supported and positioned in the approximate center of the axle; and a non-rotating flexible conduit located at least partially inside the axle and in fluid communication with the rotary connection at its first end and the pressure source at its second end, whereby the flexible conduit is movable with respect to at least one of the rotary connection and the axle, allowing for misalignment therebetween.

* * * * *